April 29, 1969    W. H. SAWYER ET AL    3,441,377
COMPLEXING LIGANDS WITH A FLUIDIZED BED OF CUPROUS CHLORIDE
Filed July 2, 1965
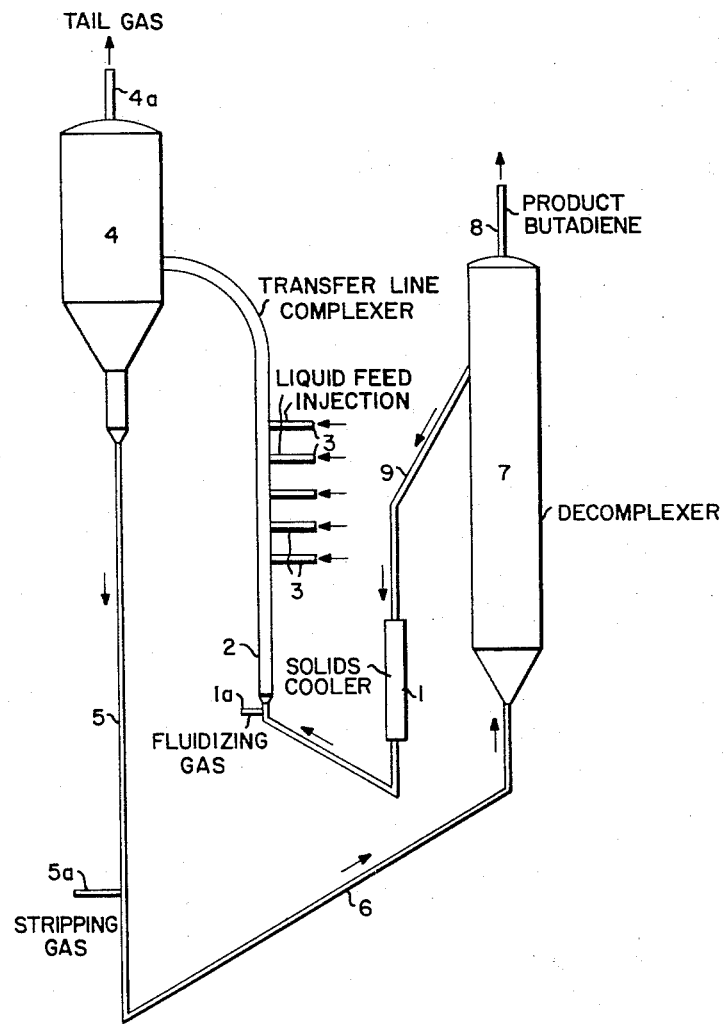
Willard H. Sawyer
Robert B. Long
Donald J. Gardner
Ralph Cecchetti
Inventors
Joseph P. Burke
Patent Attorney

3,441,377
COMPLEXING LIGANDS WITH A FLUIDIZED BED OF CUPROUS CHLORIDE

Willard Hall Sawyer, Baton Rouge, La., Robert B. Long, Atlantic Highlands, Donald J. Gardner, Murray Hill, and Ralph Cecchetti, Hanover, N.J., assignors to Esso Research and Engineering Company, a corporation of Delaware
Filed July 2, 1965, Ser. No. 469,102
Int. Cl. C01b 31/18, 21/00
U.S. Cl. 23—204                                33 Claims

ABSTRACT OF THE DISCLOSURE

Complexible ligands are selectively recovered from feed streams containing them by injecting the feed as a ligand into a gas fluidized bed of cuprous halide sorbent particles, whereby the desired ligand is selectively complexed; the ligand may be recovered by desorbing the complex which also regenerates the sorbent; ligands, such as butadiene, useful as a chemical intermediate, may be recovered in this manner.

---

The present invention is directed to a process for selectively separating and recovering olefins (e.g. $C_2$ to $C_{20}$ including $C_2$ to $C_{20}$ monoolefins such as ethylene, propylene; $C_4$ to $C_{10}$ conjugated diolefins, e.g. butadiene, etc.) and other complexable ligands in high purity, e.g. 95+ wt. percent, from hydrocarbon feed stream mixtures containing them in lesser concentrations by a process which, in brief compass, comprises injecting a liquid feed stream containing the olefin sought to be recovered into a suitable device for enabling contact of said liquid feed with gas fluidized active cuprous halide sorbent particles to complex said cuprous halide sorbent with said olefin at temperatures preferably no higher than about 10° F. above the dew point of said liquid feed stream; and then dissociating said complex, e.g. by thermal decomplexion, to recover said sought olefin and regenerate said sorbent particles.

More specifically, this invention is directed to a substantially heat balanced process for recovering butadiene in 95+ wt. percent purity, i.e. having less than 5 wt. percent impurities, from hydrocarbon feed streams containing it in considerably lesser concentrations by: (1) introducing into a suitable contacting device a gas fluidized body of porous, active solid particulate cuprous halide sorbent (which can be in the form of fluidized beds of widely varying densities); (2) injecting liquid butadiene-containing olefinic hydrocarbon feed streams into said fluidized body of sorbent particles at at least one and preferably a plurality of zones to attain intimate contact of said feed streams with said sorbent particles and selective complexation of butadiene therewith at temperatures prefereably no higher than about 5° F. above the dew point of said feed stream, and (3) subjecting said cuprous halide-butadiene complex to conditions of temperature and pressure such that the dissociation pressure of said complex exceeds the partial pressure of butadiene. Consequently the complex decomposes with release of butadiene.

According to one preferred embodiment of this invention 99+ percent pure butadiene is recovered from monoolefinic feed streams containing it in considerably more dilute form, e.g. as low as 15 wt. percent, by introducing a fluidized body of porous particulate, solid active cuprous chloride sorbent, having a porosity above about 10% (of the volume of a particle) 550 to 10,000 A. pores, and fluidized by an upwardly moving gas, into a vertical transfer line; cooling the gaseous-solid upwardly moving fluidized mass; injecting liquid butadiene-containing predominantly monoolefinic (mixtures) feed streams into said fluidized mass at one zone or a plurality of spaced zones along the upward extent of said transfer line; complexing the butadiene with the active cuprous chloride sorbent at temperatures no higher than 5° F. above the dew point of the gaseous mixture composed of the fluidizing gas and the vaporized gas emanating from said liquid injected feed stream; stripping the monoolefinic components from said gas and complexed cuprous chloride sorbent while collecting said butadiene complexed sorbent; thermally decomplexing said cuprous chloride-butadiene complex to recover butadiene therefrom in substantially purified form and reactivate the cuprous chloride sorbent particles for further use in repeated sorption (complexing) and desorption (decomplexing) operations, e.g. by recycling them to the transfer line.

Certain prior art olefin separation processes for recovering butadiene from dilute refinery $C_4$ olefin feed streams are based on vapor phase selective complexing of the butadiene followed by decomplexing to recoup the separated butadiene. Although some of these processes employ cuprous halide sorbents having high activity for butadiene sorption produced by specific cuprous halide sorbent preparation processes, these prior art processes often require at least several complexation stages to be conducted, each complexing stage being conducted in a separate fixed or fluidized complexing bed due to the highly exothermic nature of the complexation reaction and the slow vapor phase reaction rate involved. In turn, each complexing bed must be cooled using a large number of cooling tubes internally disposed within each complexing bed to remove the heat of reaction. These tubes, of course, depending upon the conditions used sometimes require maintenance, cleaning, etc., to prevent complex bed reactor fouling. Moreover, such prior art processes compared to the present processes require a large inventory of cuprous halide sorbent since each complexing bed must contain sufficient sorbent to insure the attainment of quantitative goals. As noted above, in such prior art processes, a plurality of (usually several) complexing beds are often required to enhance the attainment of quantitative objectives, viz., a high percent, e.g. 60+ percent, recovery of butadiene of high purity, e.g. 95+ percent pure, at reasonably rapid raw feed throughput rates. Thus these conventional prior art processes are very expensive due to the necessity of maintaining conventional refrigeration, viz., a large number of cooling tubes in each complexing bed, a plurality of complexing beds, and a large inventory of cuprous halide sorbent throughout processing. These increased apparatus, refrigeration and inventory costs plus maintenance costs due to deposition and coating of complex on the cooling tubes detract significantly from the economic incentive of high purity product butadiene otherwise offered by such prior art processes.

Certain other prior art olefin separation processes for recovering butadiene from dilute refinery $C_4$ olefin feed streams are based on liquid phase contacting of the feed with the cuprous halide. These processes ordinarily suffer from caking agglomeration of the particles which require cement mixer type apparatus, scrapers, etc. both in complexing and in decomplexing resulting in much reduced activity. Also, of course complete separation of the uncomplexed material from the complexed cuprous chloride so as to obtain pure product is extremely difficult. It is surprising that the present process employing liquid phase injection successfully avoids these drawbacks.

The present invention effectively overcomes the above drawbacks and constitutes a highly advantageous solution to these and other problems encountered with such prior art olefin separation and recovery processes. Thus the present invention reduces the investment, apparatus refrigeration and maintenance costs because no cooling tubes are required. The cooling is supplied by vaporization of the non-preferentially complexing components of the liquid injected feed stream. Moreover, according to the above-mentioned preferred embodiment of this invention, viz., where the complexing is conducted in a vertical transfer line, further apparatus economies are secured because only one complexing vessel (a transfer line of reduced size) need be used to obtain high purity butadiene (99+ percent pure) in the product stream coupled with reasonably high percent recovery (60+ percent) at swift throughput rates.

In general the present invention effects substantial economies in equipment, maintenance and sorbent inventory costs and minimizes the extraneous cooling equipment necessary for effective operation. Some recycle of the non-preferentially complexed feed stream components, e.g. in the case of butadiene feed streams the monoolefins and paraffins, is usually desirable to heat balance the suitable contacting device.

A significant advantage of this invention, regardless of what suitable feed-sorbent contacting device is used, is the large reductions in cuprous halide sorbent inventory, viz. amount of sorbent required for complexing-decomplexing. For example, the present inventors have discovered that active cuprous halide sorbent inventory reductions of 80+ percent (in the amount of active cuprous halide sorbent required to effectively conduct butadiene separation and recovery) can be achieved readily by the present invention due to the much higher complexation reaction rates when the complexation reaction is conducted by injecting a liquid butadiene-containing feed and complexing at temperatures no higher than about 30° F. above the butadiene dew point and preferably no higher than about 5° F. above said dew point. Less sorbent is required in the present invention process than the prior art vapor phase complexation processes because the liquid phase reactions attained by the process of this invention occur approximately twenty-five (25) to one hundred (100) times faster (or even greater) than said vapor phase prior art complexation processes.

These and other advantages of this invention will be apparent from the description which follows.

The active cuprous halide sorbent particles employed in accordance with the olefin separation and recovery process of this invention can be prepared conveniently and satisfactorily using a wide variety of sorbent preparation procedures, e.g. as set forth in U.S. Ser. Nos. 333,925 and 333,926 filed on Dec. 27, 1963 both now abandoned and the disclosure of these cuprous halide sorbent preparation procedures is incorporated herein by reference. Some exemplary procedures are indicated hereinbelow.

Suitable cuprous halide salts which can be employed in order to prepare active cuprous halide sorbents suitable for use in accordance with the present invention include cuprous chloride, cuprous bromide, and cuprous iodide with the preferred cuprous halide salt being cuprous chloride. The purity of the cuprous halide salt should be at least 90%, and usually the purity thereof ranges from 90 to 100%, and more preferably from 99.0 to 100%. The moisture content of the cuprous halide salt, from which the active cuprous halide sorbents are prepared, should usually not exceed 1.0 wt. percent and preferably should not exceed about 0.5 wt. percent (based on dry cuprous halide salt). In essence, the active cuprous halide sorbents suitable for use according to this invention are prepared by complexing a solution or slurry of the cuprous halide salts with use of a complexing ligand capable of forming a stable copper-ligand complex having a mole ratio of copper to complexing ligand of greater than 1:1. If the copper-ligand complex is formed from a solution of the cuprous halide salts, the cuprous halide solution can be made by dissolving the cuprous halide sorbed therein at temperatures ranging from about −40° F. to about 140° F., usually accompanied by stirring or other forms of agitation to insure adequate dissolving of the salt in the solvent. While a wide variety of solvents can be used, usually it is advisable to employ a $C_4$ to $C_{10}$ monoolefinic solvent when forming the cuprous halide-ligand complex from a cuprous halide solution. The solvent, when a mixture of $C_4$ to $C_{10}$ monoolefins is employed, can contain a small amount of other hydrocarbon materials with the proviso being that the solvent mixture should be comprised chiefly of $C_4$ to $C_{10}$ monoolefins, viz., usually containing about 60+ wt. percent and more preferably from 75 to 100 wt. percent of said $C_4$ to $C_{10}$ monoolefins based on total solvent. Such optional hydrocarbon diluents as paraffins, cyclo paraffins, cyclo olefins, conjugated and non-conjugated diolefins, and aromatics can be tolerated in the solvent mixture if present in small amounts. When conjugated diolefins are present in the solvent mixture, the concentration thereof should usually be less than about 0.5 wt. percent based on total solvent mixture. Usually the solvent is adjusted to temperatures of about −40 to about 100° F. prior to adding the cuprous halide salt thereto.

The thus formed solutions can be filtered to remove insolubles prior to complexing and activation (decomplexing).

An alternative way to prepare the cuprous halide salt for complexing is to form a slurry of the cuprous halide salt in the solvent using more cuprous halide salt than is dissolved at a given temperature within the range of −40 to 100° F. and then complexing the salt with a suitable complexing ligand which upon dissociation (decomplexing) imparts the desired preferred porosity to the activated cuprous halide sorbent.

As noted hereinabove, the slurry process can employ the same solvents referred to hereinabove, viz., the $C_4$ to $C_{10}$ linear and branched alphaolefin olefinic solvents and solvent mixtures, with respect to the solution procedures. Suitable exemplary $C_4$ to $C_{10}$ monoolefins which can be employed in the above mentioned solution and slurry processes to prepare the cuprous halide salt for complexation include, but are not limited to, the following: butene-1, isobutylene, pentene-1, hexene-1, heptene-1, octene-1, nonene-1, decene-1, 2-methyl butene-1, 2-methyl butene-2, 2-methyl pentene-1 (and other branched alpha olefins), and mixtures of any two or more of the above mentioned $C_4$ to $C_{10}$ monoolefins. The solvent, when a mixture of $C_4$ to $C_{10}$ monoolefins is employed, can contain a small amount of other hydrocarbon diluent materials of the type and in the concentrations mentioned hereinabove. Once the cuprous halide salt is prepared for complexing with a suitable ligand, either by solution or slurry processing as mentioned hereinabove, the "conditioning" complexing decomplexing steps can then be conducted.

The "conditioning" complexation reaction is conducted using any suitable complexing compound capable of forming a stable copper-ligand complex having a mole ratio of copper to complexing ligand of greater than 1:1. Preferably a complexing agent is employed which forms a stable complex having a mole ratio of copper to complexing moiety of 2:1 and higher. Such compounds include both materials which form only complexes having said ratios of copper to complexing compound greater than 1:1 and also compounds which form complexes having a ratio of 1:1 or less which upon decomplexing pass through a stable complex having a ratio of copper to complexing compound greater than 1:1. Thus, certain materials, e.g., nitriles, diolefins, acetylenes, carbon monoxide, etc., under ordinary conditions forming a 2:1 complex can be made to complex in ratios of copper to complexing compound of 1:1 or less. However, upon dissociation, complexing material is released selectively from a bed of cuprous halide until the stable complex, viz., the complex having a copper to complexing moiety mole ratio above 1:1, e.g. 2:1 stoichiometric complex, is completely formed before further decomplexing to the uncomplexed cuprous halide occurs. In this specification by "stable complex" is meant a stoichiometric complex stable upon dissociation as described in the preceding sentence. Such complexing agents (ligands) as contemplated herein include, but are not limited to, the following: $C_3$ to $C_{10}$ conjugated or nonconjugated aliphatic, cyclic, or alicyclic polyolefins, e.g., butadiene-1,3, isoprene, piperylene, allene, isoprene, octadienes, cyclohexadienes, cyclooctadienes, divinyl benzene, cyclododecatriene, cyclooctatetraenes, $C_2$ to $C_{10}$ aliphatic or alicyclic acetylenes or acetylenes containing additional unsaturation, e.g., acetylene, methyl acetylene, propylacetylenes, phenylacetylene, vinylacetylene, etc.; $C_2$ to $C_{10}$ or higher unsaturated or saturated aliphatic or alicyclic nitriles, e.g., aceto nitrile, acrylonitrile, propiononitrile, phenylnitrile, methacrylonitrile, ethacrylonitrile, etc.; carbon monoxide HCN; etc. More than one of these functional groups can be present in a single molecule of the complexing compound. In addition, the complexing compound can contain other functional groups so long as they do not interfere wtih complex formation. The preferred "conditioning" complexing agent is butadiene. Moreover, aqueous slurry procedures, e.g., as disclosed in Ser. No. 333,925 and 333,926, can be used to prepare these cuprous halide sorbent particles.

According to a preferred embodiment of this invention cuprous halide, esp. cuprous chloride, sorbent particles are employed which after activation have a porosity of above about 10% (of the total volume of a particle) 550 to 10,000 A. pores, as determined by mercury porosimeter measurements. Chracteristically these preferred porous, active cuprous chloride particles possess an average size (particle size diameter) ranging from about 50 to about 125 microns.

The cuprous halide previously prepared for complexation, e.g., by the solution or slurry processes, can then be contacted with the suitable complexing agent preferably by passing the complexing agent into the cuprous halide solution or slurry at temperatures ranging from about —40 to about 100° F. using pressures ranging from about 0 to 50 p.s.i.g. for reaction periods ranging from about 30 to 240 minutes. It has been found helpful to control the rate of the addition of the "conditioning" complex compound to a rate ranging from about 0.05 to 0.6 moles of said complexing compound per hour per mole of cuprous halide salt dissolved or dispersed (slurried) in the $C_4$ to $C_{10}$ monoolefin solvents. When the "conditioning" complexing agent is butadiene, the butadiene can be used in concentrated or dilute form, e.g., diluted with either an inert gas, such as nitrogen, methane, ethane, etc.; or naturally diluted butadiene as present in butadine-containing $C_4$ petroleum streams, e.g., butadiene diluted with butaine and butenes, can be employed so long as the diluent(s) did not interfere with the precipitation of the desired solid cuprous halide-butadiene complex. When using butadiene as the "conditioning" complexing agent, the temperatures at which the butadiene is contacted with the cuprous halide solution or slurry usually range from about —40 to 100° F. In such cases the butadiene is usually passed either in gaseous or liquid form (diluted or undiluted with various inert materials) into the cuprous halide solution or slurry at a butadiene addition rate ranging from about 0.05 to 0.5 moles of butadiene per hour per mole of dissolved or slurried cuprous halide salt. After substantially complete precipitation of the cuprous halide-butadiene complexes taking place, the precipiated complex is past in the form of a slurry to a suitable deliquefying device, such as a centrifuge, hydroclone or other equivalent deliquefying apparatus. The partially deliquefied cuprous halide-butadiene complex can then be collected, usually in the form of a wet cake, and subjected to subsequent drying and decomplexation (activation). The activation procedure, whereby the active cuprous halide sorbent is achieved, is conducted by heating the cuprous halide-butadiene (or other ligand-containing) complex at conditions of temperature and pressure such that the dissociation pressure of the complex exceeds the partial pressure of the complexing ligand, consequently, the complex decomposes with release of the sorbed complexing ligand, which can then be recovered by conventional means. The "conditioning" complexing agent, e.g., butadiene, can then be recovered by heating the complex at tempretaures of 140 to 200° F., usually from 160 to 190° F., and preferably from about 170 to 190° F. to cause thermal decomplexation leaving the decomplexed cuprous halide particles in activated condition whereby they can be used in accordance with this invention in selectivity sorbing complexable olefins, e.g., butadiene, ethylene, propylene, etc., from hydrocarbon mixtures containing them.

According to another embodiment of this invention where the complexing (separation) is conducted in a transfer line, the cuprous halide sorbents can be prepared in situ in the transfer line complexer by slowly adding small amounts of raw (commercial) cuprous halide salt (along with said active porous sorbent) to the fluidized mass in the transfer line while the temperature is no higher than 10° F. above the dew point and more preferably no more than 5° F. above the dew point because at the dew point (most preferred) the active, porous sorbent is produced in situ.

Moreover, in a much less preferred embodiment, commercial (raw) cuprous halide salt, alone, can be used in the complexer. However, when this procedure is employed it is advisable to employ it in conjunction with the separation and recovery of olefins or other ligands capable of forming stable copper complexes having a mole ratio of copper to complexing ligand of greater than 1:1, e.g., those complexing ligands referred to hereinabove as "conditioning" ligands.

At the ouset of the olefin separation and recovery process, the active cuprous halide sorbent is contacted with the olefin containing feed to effect complexation of the selectively removable ligand, e.g. butadiene. The cuprous halide sorbent can be provided in any fluidized form where a gas (vaporized) fluidizing agent is used, e.g., fluidized bed, transfer line, etc., of dilute to dense fluidized phase. Moreover the olefin separation and recovery process can be conducted continuously or intermittently using one or more sorbent beds for sorption and desorption, respectively. Also the same vessel can be operated first on sorption and then on desorption. While the below discussion refers mainly to transfer line complexing (sorption) of the olefin, it should be clearly understood that the other forms and vessels can be used.

According to a preferred embodiment of this invention, the complexing (sorption) of the sought olefin is accomplished in a transfer line contacting device, e.g. of the type shown in FIGURE 1. FIGURE 1 is an isometric plan view showing an olefin separation and recovery apparatus involving a transfer line complexer and a fluid bed decomplexer.

Active cuprous halide sorbent particles are cooled to a temperature within 10° F. of the fluidizing gas dew point in solids cooler 1. The cooled solids are then transported to the bottom of transfer line 2 where they are picked up and filuidized by an upwardly moving fluidizing gas, which can be a mixture of $C_2$ to $C_6$ paraffins and/or monoolefins, with a minor amount of a complexable ligand. The superficial upward velocity of the fluidizing gas in the transfer line complexer usually ranges from about 0.5 to 8.0 feet/second and the bed density usually ranges from about 20 to 70 pounds per cubic foot. The fluidizing gas is introduced at or near the bottom of the transfer line at temperatures at least 5° F. above its own dew point, and more usually 10 to 20° F. above its dew point. For a butadiene recovery process where the fluidizing gas is predominantly a mixture of butene-1, isobutylene and butadiene the fluidizing gas temperature at introduction can range from 60 to 130° F.

Then the liquid fresh feed stream is injected at one or a plurality of spaced points or zones along the upward extent of the transfer line complexer 2 at a temperature usually 5° F. or more below its own dewpoint at the pressure of injection. While this liquid feed can be injected at one point to define a single chief complexation zone; it is preferred to inject the liquid fresh feed, containing the ligand (olefin) to be removed at a plurality of spaced points or liquid feed injection zones along the transfer line as noted in the accompanying drawing. This fresh liquid feed stream contains the ligand sought to be recovered and the other hydrocarbons, the vaporization of which supplies the cooling for conducting the complexation no higher than 10° F. above the dew point of the fluidizing gas-feed stream mixture. Usually the liquid fresh feed stream is comprised of a predominant amount of readily vaporizable "cooling" components, e.g., $C_2$ to $C_6$ paraffins and/or monoolefins (the latter being far less preferentially complexed with the cuprous halide sorbent than the ligand sought to be removed) and lesser amounts, e.g. from 5 to <50 wt. percent, of the ligand sought to be recovered from the feed stream, e.g. butadiene.

According to a less preferred embodiment of this invention, the liquid fresh feed stream can be injected at its boiling point as this will still provide some cooling power, which can be supplemented by additional cooling.

During this liquid feed injection, the upwardly moving fluidized cuprous chloride sorbent complexes selectively with said ligand component of the feed stream effecting the separation thereof from the feed stream. This complexation (sorption) is preferably conducted at temperatures no higher than about 5° F. above the dew point of the gaseous mixture composed of the fluidizing gas and the vaporized gas emanating from said liquid feed streams (said vaporization being due to the highly exothermic nature of the complexation reaction). When the ligand sought to be recovered is ethylene (or propylene), a cuprous halide-ethylene (or propylene) complex is formed having a 1:1 mole ratio of copper to ethylene. On the other hand when the ligand sought to be recovered it butadiene, a cuprous halide-butadiene complex is formed having a mole ratio of copper to butadiene of >1:1, viz. 2:1.

Another advantage gained by injecting the liquid feed at a plurality of spaced points along the transfer line is that previously uncomplexed ligand from one complexation zone can be complexed at a higher located zone to achieve further reaction of unreacted ligand feed component, each such complexation reaction zone being sufficiently cooled to conduct the complexation at temperatures no higher than about 10° F. above said dew point and preferably no higher than 5° F. above said dew point.

The composition of the liquid fresh feed can be adjusted prior to injection to enable the heat of vaporization of the non-complexing components thereof to supply all of the refrigeration (cooling) necessary to conduct the highly exothermic complexation within the above described temperatures thus resulting in a heat-balanced complexing (sorption) phase. Usually this can be accomplished by adjusting the composition of the fresh liquid feed stream to contain from about 15 to 40 wt. percent of the selectively complexing ligand, the remainder being less selectively complexing ligands and/or non-complexing hydrocarbon components to provide most or all of the cooling power. For example, when recovering butadiene from a $C_4$ stream comprised chiefly of butadiene, butenes and butanes and wherein the complexing is conducted in a transfer line, heat-balanced complexing can be achieved by direct liquid injection of a liquid feed containing from about 20 to 30 wt. percent butadiene, the remainder being butenes and butanes. One convenient way of doing this is by maintaining the butadiene concentration of each injected liquid feed stream at from 20 to 30 wt. percent. Another way is to use higher butadiene concentrations in some liquid feed injection zones with little or no butadiene being present in others. For example, at the bottom injection zone, the liquid feed stream can contain from 30 to 40 wt. percent butadiene whereas the next injection zone can be using a liquid feed containing essentially all $C_4$ monoolefins and/or paraffins with little or no, e.g. 10 to 0 wt. percent, butadiene.

Regardless of the specific composition of the liquid feed streams, the sorbent density at the liquid feed injection zone (lower) portion of the transfer line complexer usually ranges from about 20 to 70 lbs./ft.$^3$ at fluidization superficial upward velocities in said zone(s) ranging from 1 to 7 ft./sec.

As the fluidized sorbent particles move upwardly in the transfer line past the last (uppermost) liquid feed injection zone, 3, the density of the fluidized sorbent usually decreases to from about 5 to 40 lbs./ft.$^3$ with increased corresponding superficial upward fluidization velocities of 1.5 to 15.0 ft./sec. This is the case whether a comparatively dilute or comparatively dense bed of sorbent is maintained in the liquid feed injection zones where most of the complexing takes place.

The transfer line complexer can be of substantially uniform cylindrical shape throughout its extent (as shown in the accompanying drawing) or it can be of frustoconical shape in the liquid feed injection zone(s) portion having a smaller lower diameter at the solids inlet (bottom) which increases gradually up to the uppermost liquid feed injection zone and then is uniform from that zone to its uppermost extent (not shown). Any suitable configuration can be used which permits satisfactory fluid-solid contact to occur. The ratio between the length and diameter, respectively, of the transfer line (L/D ratio) can range from 10 to 300:1, usually ranges from 15 to 200:1 and more preferably ranges from about 20 to about 150:1.

The complexed cuprous halide sorbent particles containing the sorbed butadiene then fluidize to the top of transfer line 2 and across to separation and collecting chamber or drum 4 where the complex particles are separated from the fluidizing gas which passes overhead through line 4a and collected for stripping and decomplexing (desorption). This separation is conducted at temperatures above the dew point of said gas and usually below the optimum decomplexing temperature of the cuprous halide-butadiene complex, viz., temperatures of about at least 5 to 10° F. above said dew point.

Following the separation of solid complex particles, these solids are collected in drum 4 and simultaneously therewith still further amounts of butadiene (gaseous) are contacted with these solids in drum 4 and standpipe 5 to aid in stripping residual less preferentially sorbed $C_4$ monoolefins therefrom. The butadiene concentration of the stripping gas supplied through line 5a usually ranges from 75 to 100 wt. percent, and more preferably 95 to 100 wt. percent. As noted pure gaseous butadiene can be used to strip residual $C_4$ monoolefins from the complexed solids. This stripping gas can then be used as a component of the fluidizing gas supplied through line 1a, condensed and used as a component of the liquid feed, or the butadiene can be removed therefrom in a gaseous phase separation process. Some decomplexation can, and usually does, occur in the standpipe stripper.

The collected, stripped complexed solids are then carried via line 6 to fixed or fluid bed decomplexer 7 where most of the decomplexation is accomplished. Preferably the decomplexer is a fluidized bed operated at temperature and pressure conditions such that the dissociation pressure of the cuprous halide-butadiene complex exceeds the partial pressure of butadiene thereby resulting in the release of essentially pure butadiene which can be taken off as a gas through butadiene removal line 8. This decomplexing can be conducted at temperatures of about 160 to about 200° F., usually 170 to 190° F., at pressures of 0.1 to 10 atmospheres. This decomplexing also serves to reactivate the cuprous halide sorbent particles.

The thus activated (regenerated) cuprous halide sorbent particles can then be reintroduced at the bottom of said vertical transfer line complexer 2 via solids return line 9 for further use in separating and recovering more of the ligand from the feed streams in accordance with the procedure outlined hereinabove. The olefin separation and recovery process of this invention can be conducted either intermitently or continuously, but it is preferred that the separation and recovery of the desired olefin be conducted continuously, and it is a distinct advantage of this invention that the present process allows for recovery of high purity ligands in a continuous fashion with a high efficiency and good recoveries at reasonably rapid throughput rates.

When the complexing step is conducted in a transfer line complexer, as set forth hereinabove, it is usually advisable to selectively elutriate any sorbent particles of particle size of 250+ microns from the transfer line and reconstitute them into the preferred smaller particles, i.e. 50 to 125μ particles. Also in transfer line complexing, it is desirable to adjust the butadiene content of the liquid feed to be injected so that it contains at least 20 wt. percent butadiene and more preferably from >20 wt. percent to <50 wt. percent butadiene.

While the foregoing exemplary olefin separation and recovery process, employed transfer line complexing (sorption) coupled with fluid bed decomplexing (desorption) it should be understood clearly that any suitable contacting system can be employed for complexing, e.g. fixed bed(s), fluidized bed(s), coker(s), etc. as the present invention in its broadest aspects is not limited to transfer line complexing. Likewise the decomplexing step can be conducted in any suitable manner, e.g. fixed bed, and this invention is not limited to fluidized bed decomplexing.

As mentioned above the essential features of the present invention are liquid feed injection coupled preferably with complexing conducted at or near the dew point, viz. at temperatures no higher than about 10° F. above said dew point of the complexable ligand sought to be removed.

The present invention will be illustrated in further detail in the following examples which are to be considered as illustrative and not limiting this invention.

EXAMPLE 1

*Single zone liquid feed injection*

A six inch diameter, 50 ft. long transfer line was used for complexing. Solid, active cuprous chloride particles having a porosity of above about 25% (of the total volume of a particle) 550 to 10,000 A. pores were fed to and circulated through the transfer line at a rate of 5,298 lbs./hour. The superficial gas velocity at the lower portion of the transfer line was 5.3 ft./sec. The pressure at the bottom of the transfer line was 26 p.s.i.g.

Liquid butenes were injected into a nozzle at the bottom of the transfer line at a rate of 285 lbs./hr. Liquid butenes were injected at the next nozzle 5 ft. above the botom nozzle at a rate of 320 lbs./hr. By vaporizing the butenes, the active cuprous chloride solids were cooled from an entering temperature of 131° F. to within 3 to 5° F. of the dew point (ca. 70 to 75° F.) at a point 10 ft. up (from the botom of) the transfer line. At this 10 ft. point, a liquid butadiene-containing $C_4$ olefine feedstream was injected into the transfer line at a rate of 384 lbs./hr.

In the upper section of the transfer line the butadiene in the feed complexed with the cuprous chloride sorbent solids to an extent where 68 wt. percent of the butadiene present in the feed was selectively complexed. The remainder of the butadiene was vaporized non-selectively along with the butenes in the feed due to the heat of complexation. The vapor passed overhead at a velocity of 9.3 ft./sec. at 19 p.s.i.g.

The overhead vapors were condensed and some of the resulting liquid was recycled to the transfer line as butenes for cooling the cuprous chloride sorbent solids. The other pertinent conditions and results for this run are tabulated below in Table I.

Table I

| | |
|---|---|
| Liquid fresh feed rate (lbs./hr.) | 384 |
| Butadiene concentration (wt. percent) | 26.5 |
| Recycle butenes for cooling (lbs./hr.) | 605 |
| Butadiene concentration (wt. percent) | 10.9 |

Approach to dew point (temperature of fluid solids-hydrocarbon mass at given distances up transfer line)—

| Distance from transfer line botom, feet: | ° F. above dew point |
|---|---|
| 10 | 2–3 |
| 20 | 2–3 |
| 30 | 5 |
| 40 | 9 |
| 50 | 14 |

| | |
|---|---|
| Decomplexing temperatures ° F. | 185–190 |
| Butadiene recovered | 68 |
| Wt. percent butadiene recovered from fresh feed (purity of recovered butadiene) percent | 99+ |

The cuprous chloride solids entering the bottom of the transfer line were complexed to within 25.3% of theoretical (theoretical is 2 moles of CuCl/mole of butadiene). Leaving the top of the transfer line the solid was complexed to within 30.1% of theoretical. The complexed solids were transferred to the decomplexer where they were decomplexed to 25.3% of theoretical. They were then returned to the transfer line for reuse.

The CuCl solids feed was stripped before decomplexing, although this is not necessary.

The essentially pure butadiene product contained less than 100 parts per million acetylene.

EXAMPLE 2

*Plural zone liquid feed injection*

The procedure of Example 1 is repeated except that the liquid feed is introduced at three equally spaced injection zones, from injection nozzles spaced approximately five ft. apart starting ten ft. from the bottom of the transfer line. Essentially the same butadiene recovery (60+%) and purity (99+%) are secured.

EXAMPLE 3

*Single zone liquid feed injection but closer to the dew point*

Using the same transfer line as in Example 1, active cuprous halide solids were circulated through the transfer line at a rate of 4,298 lbs./hr. using a bottom superficial gas velocity of 4.7 ft./sec. and a pressure of 26 p.s.i.g.

Liquid butenes were injected into the bottom nozzle at a rate of 353 lbs./hr. The liquid butene injection rate 5 ft. above the bottom of the transfer line was 309 lbs./hr. This cooled the incoming solids from an entering temperature of 136° F. to within 0.0 to 1.0° F. of the dew point at a point ten ft. up the transfer line (where the injection of liquid butadiene-containing fresh feed took place). At the ten ft. point liquid-butadiene containing feed (21.2 wt. percent butadiene, remainder $C_4$ butenes) was injected into the transfer line at a rate of 383 lbs./hr.

In the upper section of the transfer line, the butadiene in the feed complexed with the CuCl solids to an extent of 73%. The remainder of the butadiene was vaporized non-selectively along with the butenes due to the heat of complexation. The vapor passed overhead at a velocity of 9.8 ft./sec. at 20 p.s.i.g.

The overhead vapors were condensed and some of the liquid was recycled to the bottom of the transfer line for cooling the cuprous chloride solid sorbent particles. The other pertinent conditions and results for this run are summarized below in Table II.

TABLE II

| | |
|---|---|
| Liquid fresh feed rate (lbs./hr.) | 383 |
| Butadiene concentration (wt. percent) | 21.2 |
| Recycle butenes for cooling (lbs./hr.) | 662 |
| Butadiene concentration (wt. percent) | 7.5 |

Approach to dew point—

| Distance from transfer line bottom, feet: | ° F. above dew point |
|---|---|
| 10 | 0–1 |
| 20 | 0 |
| 30 | 0 |
| 40 | 0 |
| 50 | 3–4 |

| | |
|---|---|
| Decomplexing temperatures ° F. | 185–190 |
| Butadiene recovered | 73 |
| Wt. percent butadiene recovered from fresh feed (purity of recovered butadiene) percent | 99+ |

The cuprous chloride solids entering the bottom of the transfer line were complexed to within 15.2% of theoretical capacity. Leaving the transfer line these solids were complexed to within 19.1% of theoretical capacity. The solids were transferred to the decomplexer where they were decomplexed to 15.2% of theoretical.

The product (desorbed) butadiene was essentially pure butadiene containing less than 100 parts per million acetylene.

As will be noted from a comparison of Examples 1 and 3, by operating closer to the dew point a higher butadiene recovery was secured, viz., the 73% recovery of Example 3 vs. the 69% recovery of Example 1.

In addition to the selectively sorbable compounds, butadiene, ethylene, propylene, etc., the present invention is applicable to the separation and removal of any compound capable of selectively sorbing (complexing) with said cuprous halide sorbents, e.g., the "conditioning" ligands referred to herein, from mixtures containing them.

What is claimed is:

1. A process for separating and recovering selectively sorbable compounds selected from the group consisting of olefins, acetylenes, nitriles, and carbon monoxide from mixtures containing them which comprises passing a liquid feed mixture containing (a) the selectively sorbable compound into direct contact with a gas-fluidized bed of solid cuprous halide sorbent particles at temperature and pressure conditions and for a sufficient time period to complex a substantial portion of said selectively sorbable compound, the temperature of the gas fluidized bed being no more than 30° F. above the dew point of the liquid feed mixture, thereby liberating heat and vaporizing the nonselectively sorbable compounds of the liquid feed mixture, and then subjecting said complex to conditions of temperature and pressure such that the dissociation pressure of said complex exceeds the partial pressure of said complexed selectively sorbable compound thereby releasing said compound in substantially purified form.

2. The process of claim 1 in which the temperature of the gas fluidized bed is no more than 20° F. above the dew point of the liquid feed mixture.

3. The process of claim 1 in which the temperature of the gas fluidized bed is no more than 10° F. above the dew point of the liquid feed mixture.

4. A process as in claim 1 wherein said cuprous halide is cuprous chloride.

5. A process as in claim 1 wherein said cuprous halide sorbent particles have a porosity of above about 10% (of the total volume of a particle) 550 to 10,000 A. pores.

6. A process as in claim 5 wherein said cuprous halide is cuprous chloride.

7. A process as in claim 1 wherein said selectively sorbable compound is a $C_2$ to $C_{20}$ olefin.

8. A process as in claim 7 wherein said $C_2$ to $C_{20}$ olefin is a monoolefin.

9. A process as in claim 7 wherein said olefin is a $C_4$ to $C_{10}$ conjugated diolefin.

10. A process as in claim 9 wherein said monoolefin is ethylene.

11. A process as in claim 9 wherein said conjugated diolefin is butadiene.

12. A process as in claim 1 in which the selectively absorbable compound is a $C_2$–$C_{10}$ acetylene.

13. A process as in claim 1 in which the selectively absorbable compound is a $C_2$–$C_{10}$ nitrile.

14. A process as in claim 1 in which the selectively absorbable compound is carbon monoxide.

15. A substantially heat balanced process for separating and recovering selectively sorbable unsaturated hydrocarbons selected from the group consisting of olefins and acetylenes from mixtures containing them which comprises injecting a liquid feed mixture containing (a) the selectively sorbable unsaturated hydrocarbon into direct contact with a gas-fluidized bed of porous, solid, sorption-active cuprous halide sorbent particles having a porosity of above about 10% (of the total volume of a particle) 550 to 10,000 A. pores at temperature and pressure conditions and for a time sufficient to complex a substantial portion of said selectively sorbable unsaturated hydrocarbon at temperature no higher than about 10° F. above the dew point of said liquid feed mixture, thereby liberating heat and vaporizing the nonselectively sorbable compounds of the liquid feed mixture, and then subjecting said complex to temperature and pressure conditions such that the dissociation pressure of said complex exceeds the partial pressure of said complexed selectively sorbable unsaturated hydrocarbon thereby releasing said unsaturated hydrocarbon in substantially purified form.

16. A process as in claim 15 wherein said cuprous halide is cuprous chloride.

17. A process as in claim 15 wherein said selectively sorbed hydrocarbon is butadiene.

18. A process as in claim 15 which includes the step of adding inactive cuprous halide salt particles to said gas fluidized bed.

19. A process as in claim 17 wherein said fluidizing gas is a butadiene-containing $C_4$ hydrocarbon gas comprised chiefly of butenes.

20. A process as in claim 15 wherein said liquid feed mixture is injected at a plurality of spaced points into said gas-fluidized solid sorbent particles.

21. A substantially heat balanced process for separating and recovering selectively sorbable unsaturated compounds selected from the group consisting of olefins, acetylenes, nitriles, and carbon monoxide from mixtures containing them which comprises introducing into a vertical transfer line a body of particulate, solid, active cuprous halide sorbent having a porosity of above about 10% (of the total volume of a particle) 550 to 10,000 A. pores fluidized by an upwardly moving gas; cooling the gaseous-solid upwardly moving fluidized mass at a lower portion of said transfer line; injecting a liquid feed mixture containing (a) the selectively sorbable unsaturated compound into said inwardly moving fluidized mass to directly contact said active cuprous halide sorbent particles in said transfer line and complex a substantial portion of said unsaturated compound at temperatures no higher than about 10° F. above the dew point of the vaporized feed mixture, thereby liberating heat and vaporizing the nonselectively sorbable compounds of the liquid feed mixture; stripping nonselectively sorbed materials from said sorbent, and thermally decomplexing said complex to release said unsaturated compound in substantially purified form and reactivate said cuprous halide sorbent.

22. A process as in claim 21 wherein said cuprous halide is cuprous chloride.

23. A substantially heat balanced process for separating and recovering butadiene from butadiene-containing hydrocarbon mixtures comprised chiefly of vaporizable non-selectively sorbed monoolefins which comprises introducing into a vertical transfer line a body of particulate, solid, porous cuprous chloride sorbent, having a porosity of above about 10% (of the total volume of a particle) 550 to 10,000 A. pores, fluidized by an upwardly moving gas; cooling the gaseous-solid upwardly moving fluidized mass at a lower portion of said transfer line to a temperature within 10° F. of the dew point of said gas; injecting a liquid butadiene-containing feed stream mixture comprised chiefly of vaporizable, non-selectively sorbed monoolefins into said upwardly moving fluidized mass to directly contact said active cuprous chloride sorbent particles in said transfer line and complex a substantial portion of butadiene at temperatures no higher than about 10° F. above the dew point of the gaseous mixture composed of said fluidizing gas and the vaporized feed mixture; stripping non-selectively sorbed components from said sorbent; and thermally decomplexing said cuprous chloride-butadiene complex to release butadiene therefrom in essentially pure form and reactivate said cuprous chloride sorbent.

24. A process as in claim 23 wherein said complexing is conducted at temperatures no higher than about 5° F. above said dew point.

25. A process as in claim 23 wherein said thermal decomplexing is conducted at temperatures ranging from about 160 to about 200° F. at pressures of about 0.1 to 10 atmospheres.

26. A process as in claim 23 wherein said vaporizable, non-selectively sorbed monoolefins in said injected liquid feed stream comprises butenes.

27. A process as in claim 23 wherein said liquid feed is injected into said transfer line at a plurality of spaced zones.

28. A process as in claim 27 wherein said spaced zones are spaced vertically.

29. A process as in claim 23 wherein said liquid feed mixture contains at least about 20 wt. percent butadiene.

30. A process as in claim 23 wherein said reactivated cuprous chloride sorbent particles are recycled to the lower portion of said transfer line for further use.

31. A process as in claim 23 wherein said fluidizing gas contains butadiene.

32. A process as in claim 23 which includes the step of adding unactivated cuprous chloride salt particles to said gas fluidized bed.

33. A process as in claim 32 wherein at least a portion of said unactivated cuprous chloride particles become activated in situ within said transfer line.

References Cited

UNITED STATES PATENTS

| | | | |
|---|---|---|---|
| 2,303,118 | 11/1942 | Frey | 260—683.9 |
| 2,386,734 | 10/1945 | Wolk. | |
| 2,441,400 | 5/1948 | Doumani et al. | |
| 2,446,076 | 7/1948 | Campbell et al. | |
| 2,515,134 | 7/1950 | Murphree. | |
| 2,953,517 | 9/1960 | Whiteley et al. | 208—157 |

HERBERT LEVINE, *Primary Examiner.*

U.S. Cl. X.R.

260—438.1, 465, 465.1, 465.9, 677, 679, 681.5